US006307839B1

United States Patent
Gerszberg et al.

(10) Patent No.: US 6,307,839 B1
(45) Date of Patent: Oct. 23, 2001

(54) DYNAMIC BANDWIDTH ALLOCATION FOR USE IN THE HYBRID FIBER TWISTED PAIR LOCAL LOOP NETWORK SERVICE ARCHITECTURE

(75) Inventors: Irwin Gerszberg, Kendall Park; Dennis Matthew Romain, Convent Station; Philip Andrew Treventi, Murray Hill, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/001,425

(22) Filed: Dec. 31, 1997

(51) Int. Cl.[7] ....................................................... H04J 3/16
(52) U.S. Cl. ........................... 370/235; 370/230; 370/468
(58) Field of Search ..................................... 370/235, 230, 370/233, 363, 371, 374, 381, 468, 352, 395, 252

(56) References Cited

U.S. PATENT DOCUMENTS

| 5,280,470 | * | 1/1994 | Buhrke et al. | 370/13 |
|---|---|---|---|---|
| 5,428,819 | * | 6/1995 | Wang et al. | 455/454 |
| 5,991,292 | * | 11/1999 | Focsaneanu et al. | 370/352 |
| 6,049,531 | * | 4/2000 | Roy | 370/260 |
| 6,075,772 | * | 6/2000 | Brown et al. | 370/235 |
| 6,097,722 | * | 8/2000 | Graham et al. | 370/395 |

* cited by examiner

Primary Examiner—Wellington Chin
Assistant Examiner—Brenda Pham

(57) ABSTRACT

A dynamic bandwidth allocation system is used to optimize the transmission of traffic on the twisted pair connecting the customer premises equipment with the local office. As demand for simultaneous traffic at the customer premises equipment increases, the requirement for multiple twisted pair lines is minimized by dynamically allocating the bandwidth of the channel and sharing that bandwidth with multiple, simultaneous services.

Additional efficiencies for simultaneous transmission of traffic can be achieved by directing all traffic to occupy a smaller channel. This might slightly affect the quality of some services but in many cases the impact will be minimal. Voice signals will be allowed to decrease to a predetermined level and facsimile or other data traffic will transmit at a slower transmission rate. At some predetermined level, traffic quality will degrade to a level such that service will be unacceptable. At this point, a prioritization scheme will buffer certain traffic at the intelligent services director (terminal block) or the facilities management platform (access module). New requests for services are denied until the required bandwidth is free. Once the required bandwidth becomes available, buffered traffic is allowed to transmit or receive will flow again and service availability will resume.

An alternative scheme employs allows all services to maintain their highest quality and ranks all traffic by a priority scheme. Once the allocated bandwidth is occupied, the priority scheme discontinues or buffers lower ranking traffic. Once bandwidth resources are released by the higher ranking traffic, the lower ranking traffic is allowed to proceed if the information was buffered. By optimizing the traffic on the twisted pair, requirements for the installation of multiple twisted pairs is minimized as services are added by the user.

50 Claims, 8 Drawing Sheets

HDR-HEADER CONTAINING CONTROL INFORMATION
IN THIS EXAMPLE, EACH SLOT IS A 64 Kbps TIME SLOT

FIG. 6B

DYNAMIC BANDWIDTH ALLOCATION FOR
USE IN THE HYBRID FIBER TWISTED PAIR
LOCAL LOOP NETWORK SERVICE
ARCHITECTURE

FIELD OF THE INVENTION

This invention discloses a dynamic bandwidth allocation system to optimize the transmission of information from a local office to the customer premises equipment along a twisted pair.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's broadband digital switch (for example, ATM).

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital broadband switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

The current bandwidth allocation scheme devotes the entire channel to a specific mode of service, forcing customers to choose one mode of traffic for use with the twisted pair, e.g. voice, facsimile or Internet. As demand for simultaneous traffic increases, multiple twisted pair lines are required increasing the costs for the users and increasing the investment capital required by the service providers.

This invention addresses these problems by dynamically allocating bandwidth on the twisted pair to support multiple, simultaneous services. By providing for multiple, simultaneous services, the requirement for the installation of multiple twisted pairs dedicated to specific services is minimized. These schemes could be employed for use in other physical transmission media such as coaxial cable and fiber.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) or terminal block disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a dynamic bandwidth allocation system to optimize the transmission of traffic on the line connecting the customer premises equipment with the local office. As demand for simultaneous traffic at the customer premises equipment increases, the requirement for multiple twisted pair lines is minimized by dynamically allocating an available bandwidth of the twisted pair.

Additional efficiencies for simultaneous transmission of traffic can be achieved by restricting or reducing the available bandwidth for the existing services currently in use. This will likely affect the quality of some services but in many cases the impact will be minimal. Voice quality will be allowed to deteriorate to a predetermined level and facsimile or other data traffic will be transmitted at a slower transmission rate. At some predetermined level, traffic quality will degrade to a level such that service will be unacceptable. At this point, a prioritization scheme will buffer certain traffic at the intelligent services director or the facilities management platform. New requests for services are denied until the required bandwidth required for the service is free. Once the required bandwidth becomes available, buffered traffic is allowed to flow again and service availability will resume.

An alternative scheme allows all services to maintain their highest quality and instead ranks all traffic by a priority scheme and sequentially transmits services. Once the allocated bandwidth is used, the priority scheme discontinues or buffers lower ranking traffic. Once bandwidth resources are released by the higher ranking traffic, the lower ranking traffic is allowed to proceed if the information was buffered. By optimizing the traffic on the twisted pair, requirements for the installation of multiple twisted pairs is minimized as services are added by the user.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

The following applications, filed concurrently herewith, are hereby incorporated by reference:
1. A Hybrid Fiber Twisted-pair Local Loop Network Service Architecture U.S. application Ser. No. 09/001,360, filed Dec. 31, 1997;
2. The VideoPhone U.S. application Ser. No. 09/001,905, filed Dec. 31, 1997;
3. VideoPhone Privacy Activator U.S. application Ser. No. 09/001,909, filed Dec. 31, 1997;
4. VideoPhone Form Factor U.S. application Ser. No. 09/001,583, filed Dec. 31, 1997;
5. VideoPhone Centrally Controlled User Interface With User Selectable Options U.S. application Ser. No. 09/001,576, filed Dec. 31, 1997;
6. VideoPhone User Interface Having Multiple Menu Hierarchies U.S. application Ser. No. 09/001,908, filed Dec. 31, 1997;
7. VideoPhone Blocker U.S. application Ser. No. 09/001,353, filed Dec. 31, 1997;
8. VideoPhone Inter-com For Extension Phones U.S. application Ser. No. 09/001,358, filed Dec. 31, 1997;
9. Advertising Screen Saver U.S. application Ser. No. 09/001,574, filed Dec. 31, 1997;
10. Information Display for a Visual Communication Device U.S. application Ser. No. 09/001,906, filed Dec. 31, 1997;
11. VideoPhone Multimedia Announcement Answering Machine U.S. application Ser. No. 09/001,911, filed Dec. 31, 1997;
12. VideoPhone Multimedia Announcement Message Toolkit U.S. application Ser. No. 09/001,345, filed Dec. 31;
13. VideoPhone Multimedia Video Message Reception U.S. application Ser. No. 09/001,362, filed Dec. 31, 1997;
14. VideoPhone Multimedia Interactive Corporate Menu Answering Machine Announcement U.S. application Ser. No. 09/001,575, filed Dec. 31, 1997;
15. VideoPhone Multimedia Interactive On-Hold Information Menus U.S. application Ser. No. 09/001,356, filed Dec. 31, 1997;
16. VideoPhone Advertisement When Calling Video Non-enabled VideoPhone Users U.S. application Ser. No. 09/001,361, filed Dec. 31, 1997;
17. Motion Detection Advertising U.S. application Ser. No. 09/001,355, filed Dec. 31, 1997;
18. Interactive Commercials U.S. application Ser. No. 09/001,578, filed Dec. 31, 1997;
19. VideoPhone Electronic Catalogue Service U.S. application Ser. No. 09/001,421, filed Dec. 31, 1997;
20. A Multifunction Interface Facility Connecting Wideband Multiple Access Subscriber Loops With Various Networks (U.S. application Ser. No. 09/001,422, filed Dec. 31, 1997);
21. Life Line Support for Multiple Service Access on Single Twisted-pair U.S. application Ser. No. 09/001,343, filed Dec. 31, 1997;
22. A Network Server Platform (NSP) For a Hybrid Fiber Twisted-pair (HFTP) Local Loop Network Service Architecture U.S. application Ser. No. 09/001,582, filed Dec. 31, 1997;
23. A Communication Server Apparatus For Interactive Commercial Service U.S. application Ser. No. 09/001,344, filed Dec. 31, 1997;
24. NSP Based Multicast Digital Program Delivery Services (U.S. application Ser. No. 09/001,580, filed Dec. 31, 1997);
25. NSP Internet, JAVA Server and VideoPhone Application Server U.S. application Ser. No. 09/001,354, filed Dec. 31, 1997;
26. NSP WAN Interconnectivity Services for Corporate Telecommuting (U.S. application Ser. No. 09/001,540, filed Dec. 31, 1997;
27. NSP Telephone Directory White-Yellow Page Services U.S. application Ser. No. 09/001,426, filed Dec. 31, 1997;
28. NSP Integrated Billing System For NSP services and Telephone services U.S. application Ser. No. 09/001,350, filed Dec. 31, 1997;
29. Network Server Platform/Facility Management Platform Caching Server U.S. application Ser. No. 09/001,419, filed Dec. 31, 1997;
30. An Integrated Services Director (ISD) Overall Architecture (U.S. application Ser. No. 09/001,417, filed Dec. 31, 1997;
31. ISD VideoPhone (Customer Premises) Local House Network (U.S. application Ser. No. 09/001,418, filed Dec. 31, 1997;
32. ISD Wireless Network U.S. application Ser. No. 09/001,363, filed Dec. 31, 1997;
33. ISD Controlled Set-Top Box U.S. application Ser. No. 09/001,424, filed Dec. 31, 1997;
34. Integrated Remote Control and Phone U.S. application Ser. No. 09/001/423, filed Dec. 31, 1997;
35. Integrated Remote Control and Phone User Interface U.S. application Ser. No. 09/001,420, filed Dec. 31, 1997;
36. Integrated Remote Control and Phone Form Factor U.S. application Ser. No. 09/001,910, filed Dec. 31, 1997;
37. VideoPhone Mail Machine (U.S. application Ser. No. 60/070,104);
38. Restaurant Ordering Via VideoPhone (U.S. application Ser. No. 60/070,121);
39. Ticket Ordering Via VideoPhone (U.S. application Ser. No. 60/070,103);

40. Multi-Channel Parallel/Serial Concatenated Convolutional Codes And Trellis Coded Modulation Encode/Decoder U.S. application Ser. No. 09/001,342, filed Dec. 31, 1997;

41. Spread Spectrum Bit Allocation Algorithm U.S. application Ser. No. 09/001,842, filed Dec. 31, 1997;

42. Digital Channelizer With Arbitrary Output Frequency U.S. application Ser. No. 09/001,581. filed Dec. 31, 1997;

43. Method And Apparatus For Allocating Data Via Discrete Multiple Tones U.S. application Ser. No. 08/997,167, filed Dec. 23, 1997;

44. Method And Apparatus For Reducing Near-End Cross Talk In Discrete Multi-Tone Modulators/Demodulators U.S. application Ser. No. 08/997,176, filed Dec. 23, 1997.

In addition, the following two patent applications are hereby incorporated by reference:

1. U.S. patent application Ser. No. 08/943,312 filed Oct. 14, 1997 entitled Wideband Communication System for the Home, to Robert R. Miller, II and Jesse E. Russell, and 2. U.S. patent application Ser. No. 08/858,170, filed May 14, 1997, entitled Wide Band Transmission Through Wire, to Robert R. Miller, II, Jesse E. Russell and Richard R. Shively.

Figure 1:
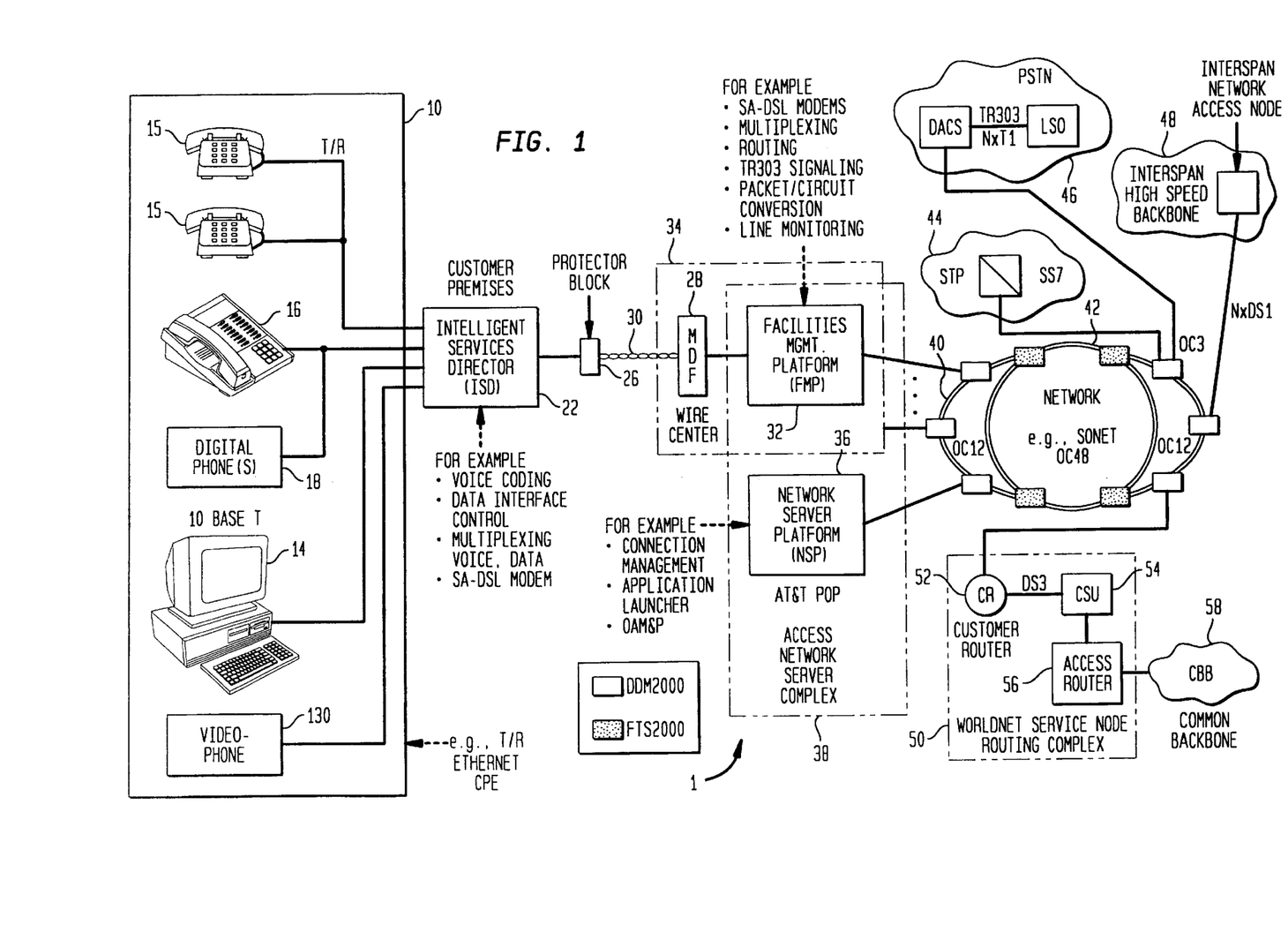
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) or terminal block 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, code division, frequency-division, synchronous, asynchronous and/or spread spectrum formats, but in exemplary embodiments uses DSL modem technology. The central office 34 preferably includes a facilities management platform (FMP) or access module 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) system management server 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users at either a subsidized cost or given away for free, with the cost of the equipment being amortized over the services sold to the user through the equipment.

Figure 2:
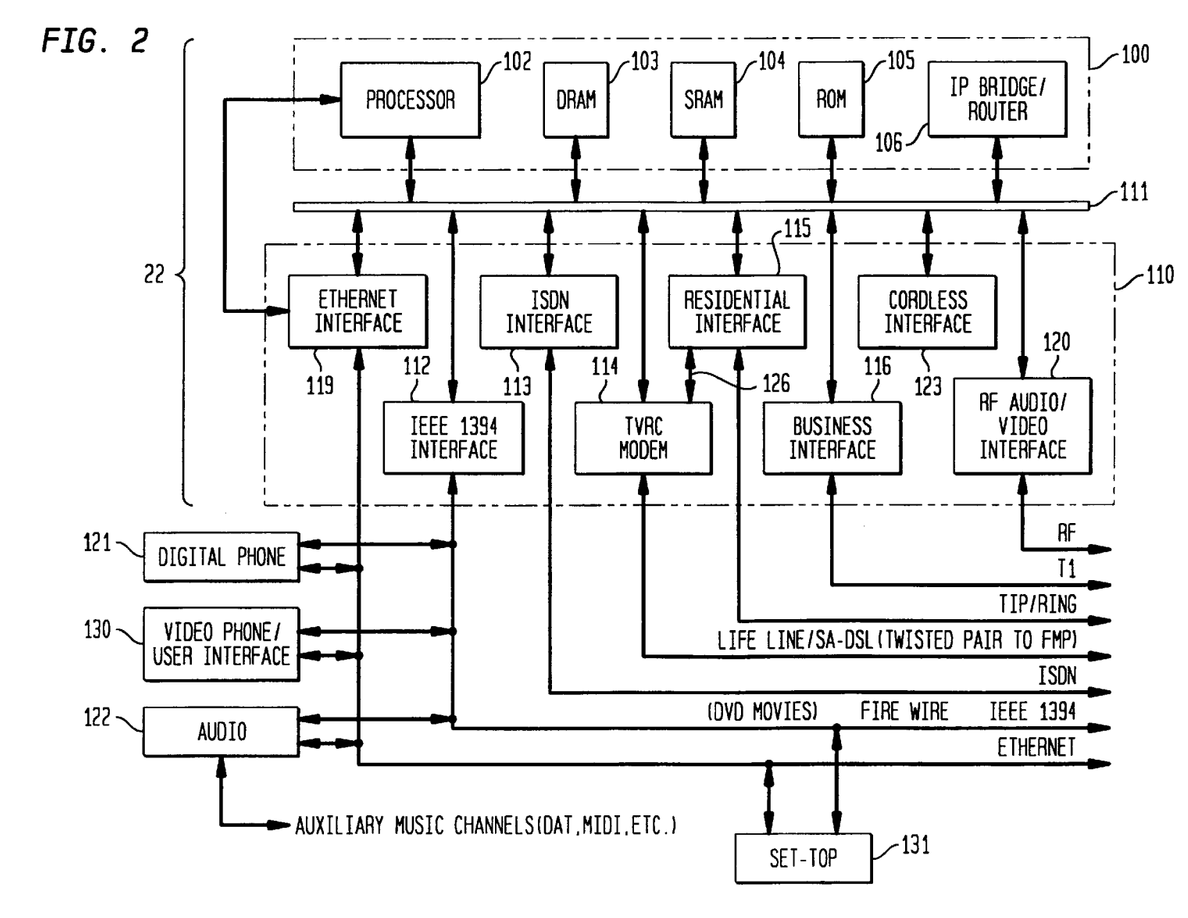
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbps data, 56 kbps data, or ISDN), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a set top device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
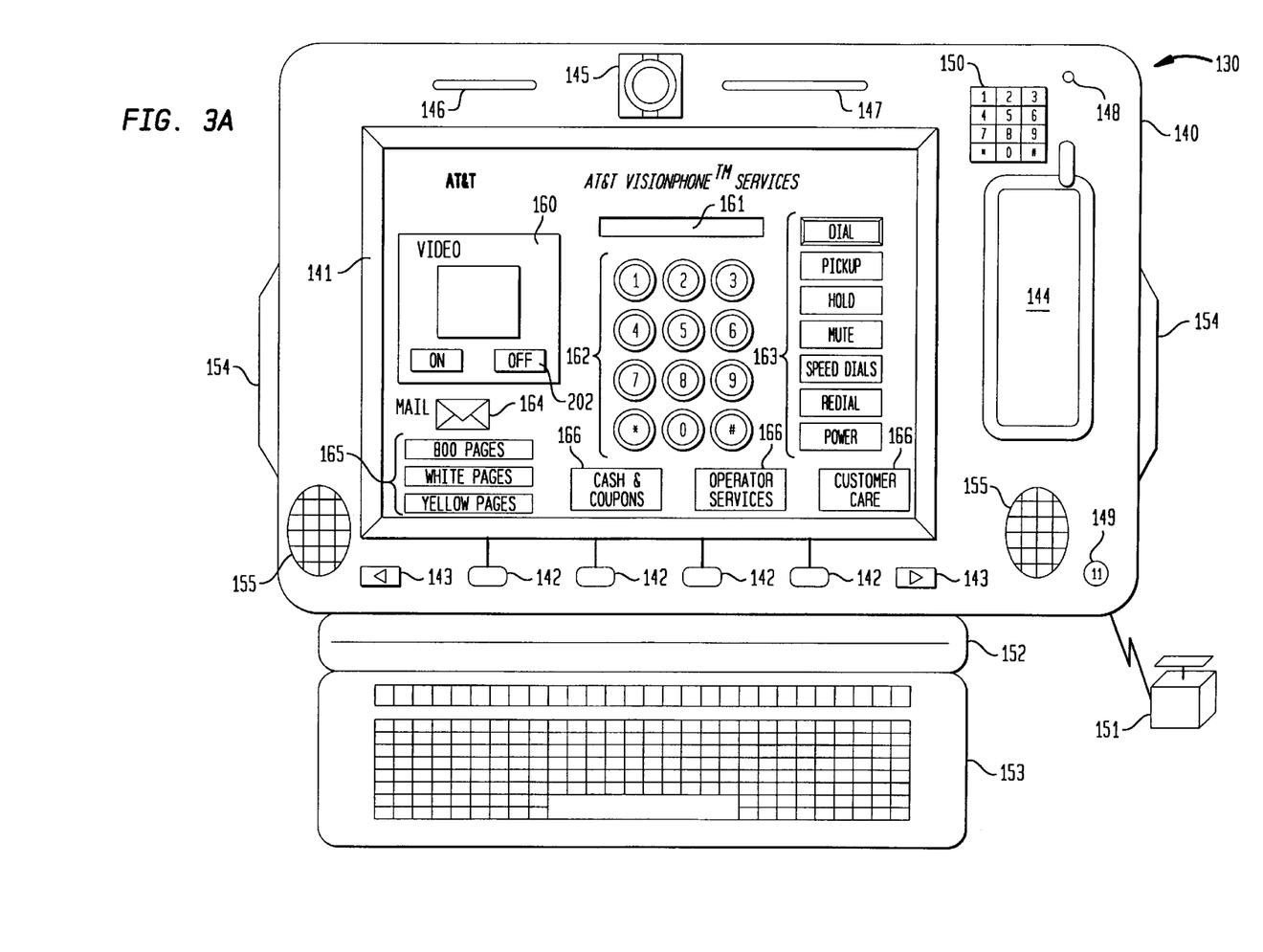
FIGS. 3A and 3B illustrate an embodiment of a video phone consistent with the architecture shown in FIG. 1.
Figure 3B:
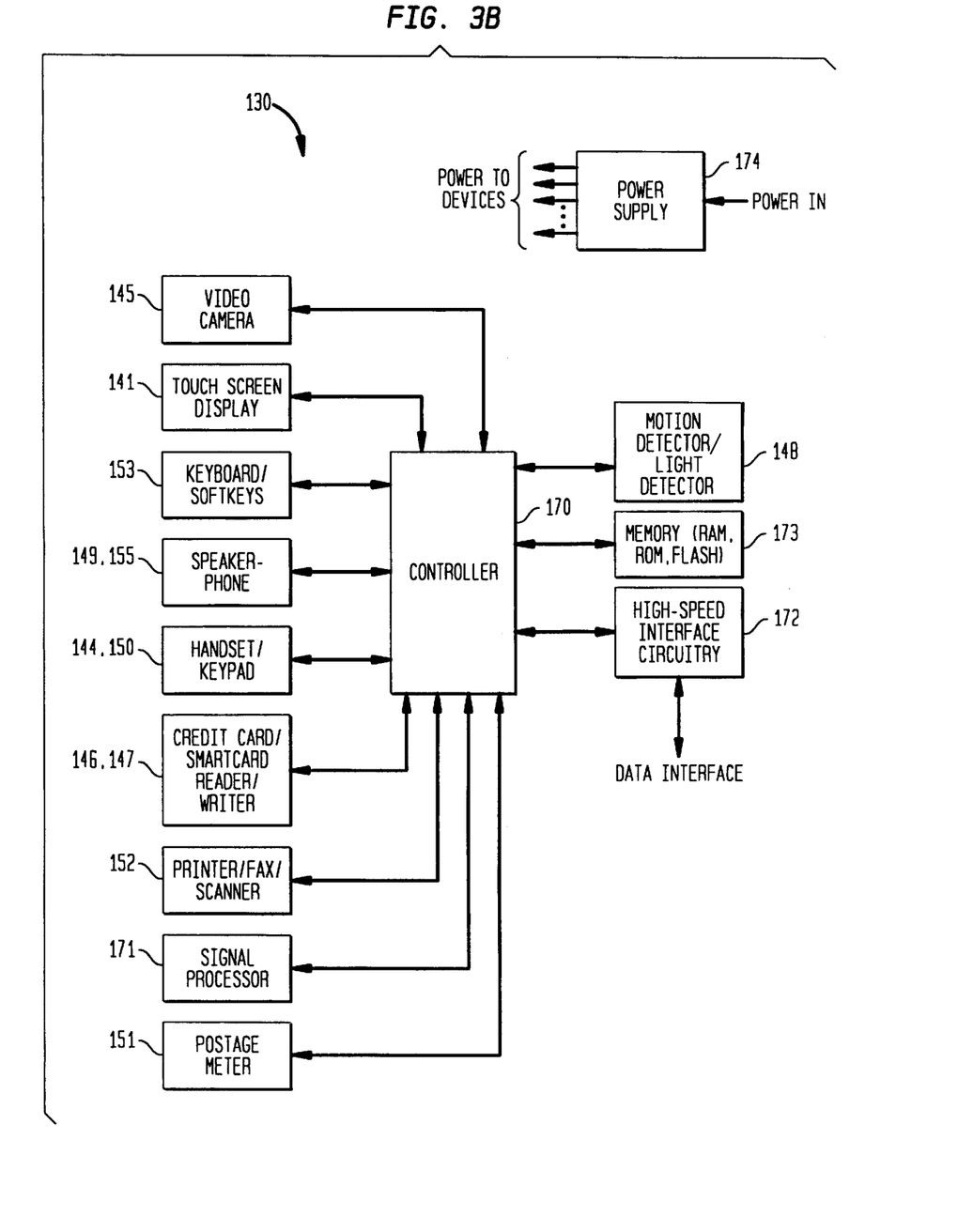

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
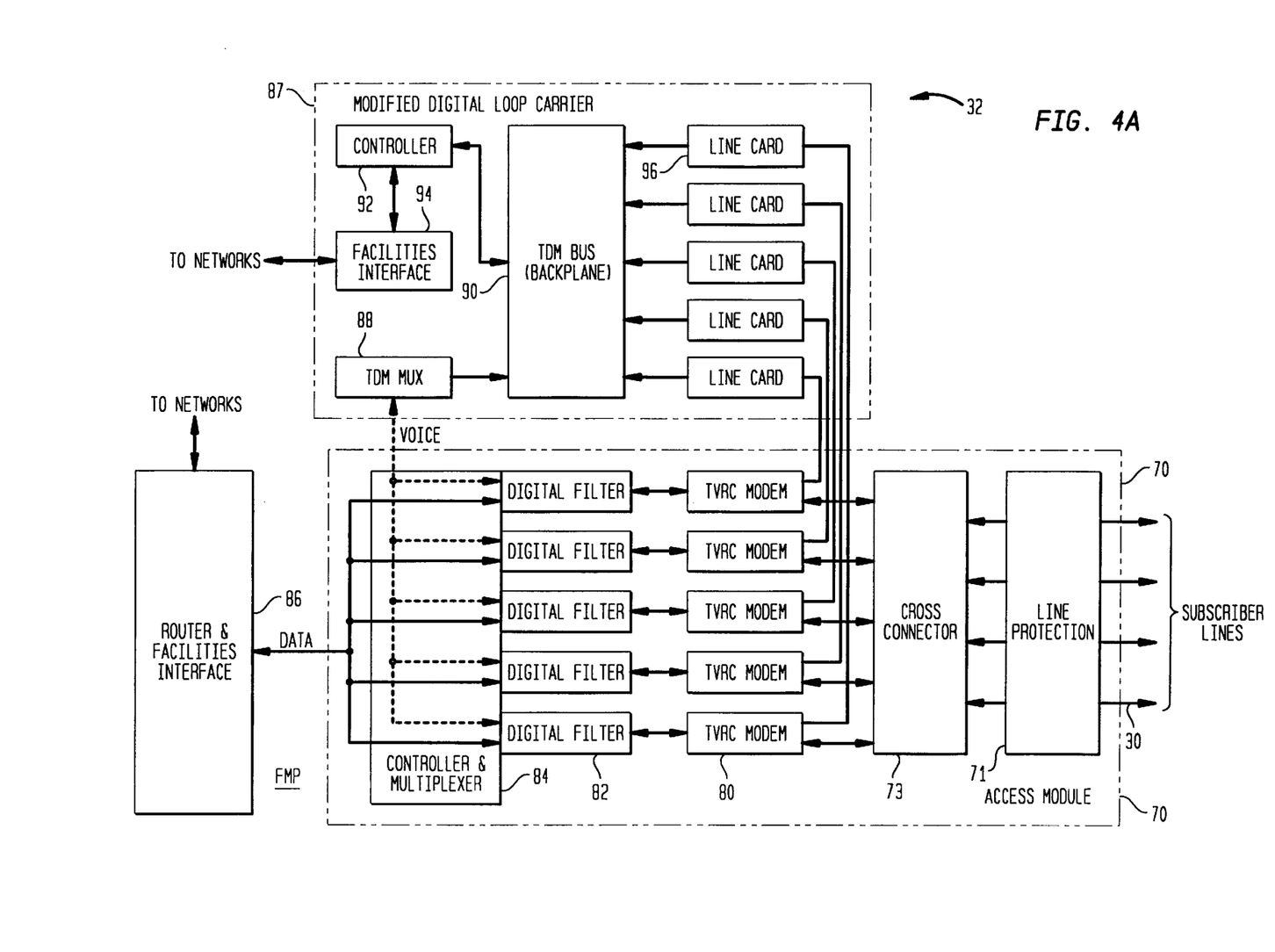
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
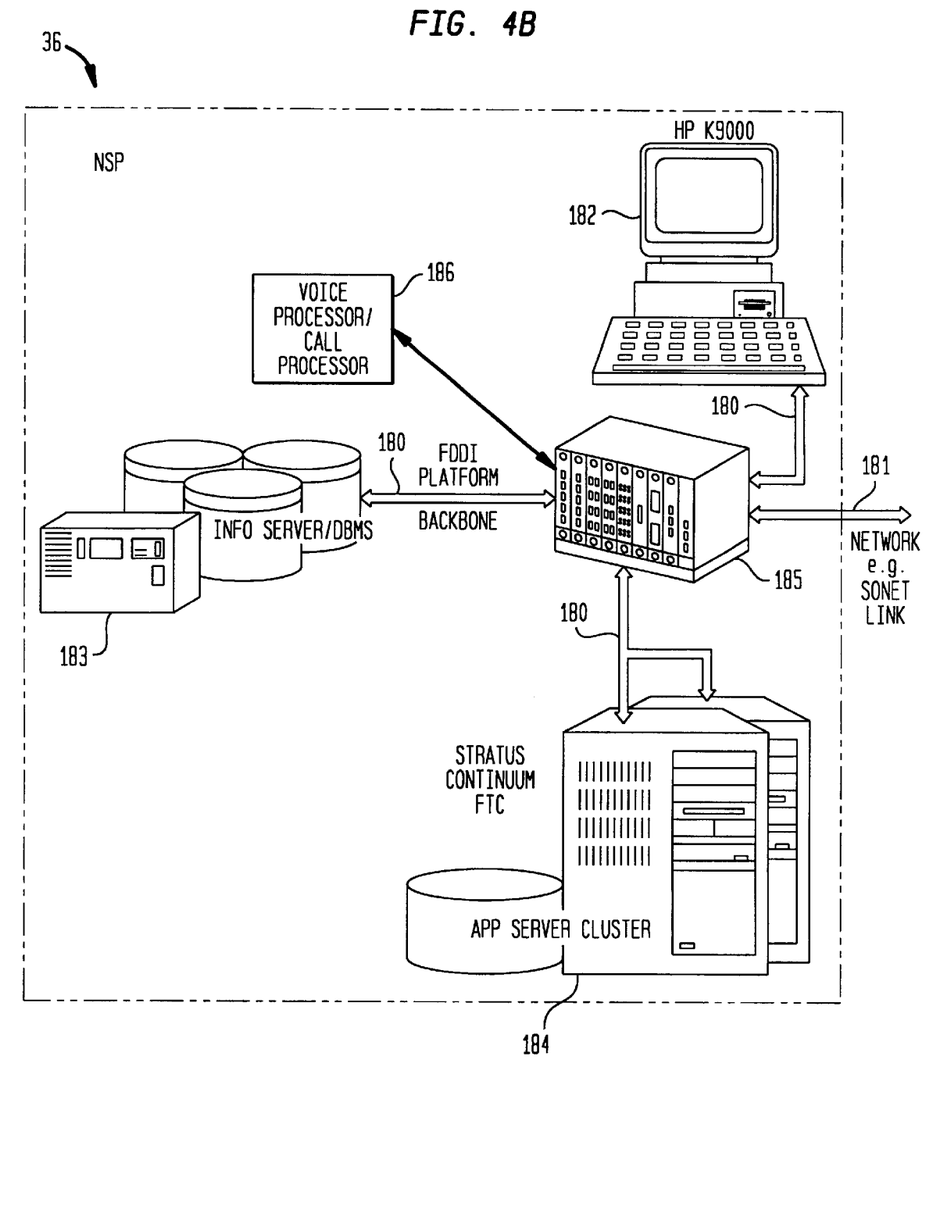
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, database services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

The dynamic bandwidth allocation schemes allow the mixing of voice and data while also dynamically allocating channel bandwidth for each service in real time. The bandwidth can be dynamically allocated in both the upstream and downstream directions. The allocation schemes allow for the addition of new services on the existing twisted pair infrastructure. Many of these services are in copending applications, incorporated by reference in this application.

Figure 5:
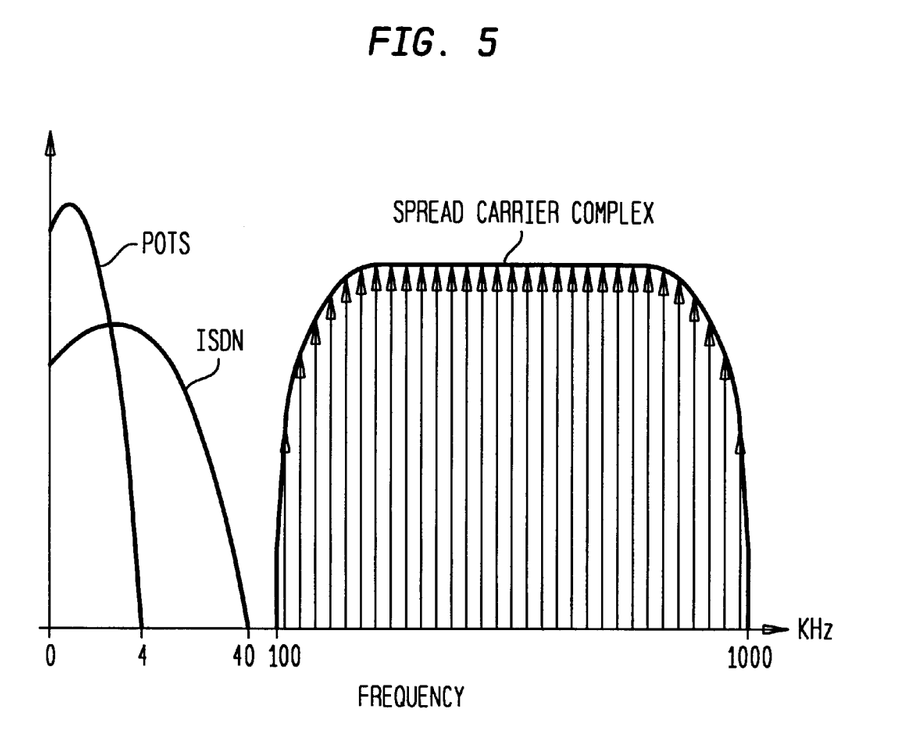
FIG. 5 illustrates a diagram of the available spectrum of a twisted pair.

FIG. 5 illustrates a diagram of the available spectrum of a twisted pair using ADSL technology. The twisted pair is a baseband arrangement excluding a gap between 40 kHz and 100 kHz. Between 0 kHz and 4 kHz, the spectrum is reserved for POTS transmissions and between 0 kHz and 40 kHz, the spectrum is reserved for ISDN transmissions. Between 100 kHz and 1 MHZ, the spectrum is reserved for other transmissions, primarily the transmission of digital data. The gap between 40 kHz and 100 kHz allows for proper separation of the voice and data signals when they are split at the FMP 32. The bandwidth allocation is flexible and is not required to be operated in the same scheme as traditional POTS line and permits expansion of the entire frequency spectrum to be between 0 kHz and approximately 1 MHz.

Both the ISD 22 and the FMP 32 have the capability to sense and seize the available bandwidth and allocate that bandwidth to the requested service, deciding the optimal bandwidth allocation scheme for managing the requested services. The circuit between the ISD 22 and the FMP 32 may be variously configured by modulating the transmission of signals in either packetized, framed, time slotted data, frequency division or code division multiplexing formats. However, it may be desirable to frame the data from a plurality of devices into a single frame in order to avoid unnecessary overhead cost. Within the single frame, dynamic reconfiguration of the frame is possible so that different devices may be assigned different amounts of time slots within the frame to dynamically vary the bandwidth allocation between the devices.

Four major categories exist for handling congestion. First, in a simplified scheme, the hardware merely detects that system resources have reached capacity and all additional requests for system resources are denied. In a second scheme, flow control involves prioritizing of all services. Telephone calls might have the highest priority while Internet, utility monitoring and metering might have the lowest priority. Lower priority services are dropped. Third, flow control involves prioritizing certain services and allowing system resources to maximize flow control by decreasing the bandwidth allocation for all the services. For voice calls, voice quality degrades. For data transmission, the data transmission rates decrease. These lower transmission rates might affect the quality of service and possibly increase bit error rates. The service quality degradation and bit error rates are monitored and controlled so that service levels are allowed to deteriorate to a predetermined minimal threshold. The fourth flow control scheme, involves a combination of prioritization and reduction in bandwidth for all current services.

When congestion occurs, an added service allows for low priority traffic to be buffered until the congestion no longer exists. Once this occurs, the buffered services are transmitted or received. The dynamic bandwidth allocation schemes also have the ability to disconnect service to devices where a channel is maintained but inactivity of the channel is detected.

Both the ISD 22 and the FMP 32 have limited buffering resources. When the buffer approaches capacity, incoming packets of data are dropped or service is terminated. When data is being sent, many endpoints such as the ISD 22 and the FMP 32 use a process called time out and retransmission.

After a particular period of time, if the transmitting interface has not received an acknowledgment, the data packet is sent again. This retransmission of data, contributes to the congestion and can also fill up the limited buffering resources. At some point, the amount of transmissions and retransmissions causes the network to malfunction, creating what is commonly referred to as congestion collapse.

For digital data transmission, the transmission of traffic can be designed based on transmission speed, block length, error rate, number of overhead bits, propagation speed, and the network's routing algorithm. Throughput can be increased by optimizing one or more of these factors.

The dynamic bandwidth allocation schemes seek to unify a high speed information and communication link between the customer services premises 10 and the communications network. The advanced network access strategy offers greater efficiency, improved cost and scaling capabilities and is able to support advanced network services. Asymmetric digital subscriber line (ADSL) technology was designed to operate on two wire, twisted cable pairs having mixed gauges. High speed simplex channels were designed for digital data transport from the network to the customer equipment premises. Low speed duplex channels were designed for digital data transport in either direction. In the original conception of ADSL, the low frequency region of the ADSL spectrum are configured for voice calls, while the high frequency region would be provisioned for digital data.

In the implementation for this invention, framing, multiplexing, and coding were examined. ADSL bearer transport rates are either low or high speed. The low speed bearer transport rates are divided into five segments and are shown in Table 1. The high speed bearer transport rate is divided into four segments and are shown in Table 2.

TABLE 1

| Bearer | Rate (Kbps) |
|---|---|
| L1 | 16 |
| L2 | 64 |
| L3 | 160 |
| L4 | 384 |
| L5 | 576 |

TABLE 2

| Bearer | Rate (Mbps) |
|---|---|
| H1 | 1.536 |
| H2 | 3.072 |
| H3 | 4.608 |
| H4 | 6.144 |

Rate of L1 and L2 are primarily used for control channel transport. The remaining low bearer transport rates L3, L4, and L5 and all of the high data rates H1, H2, H3, and H4 are used for user data. All the bearer transport rates are multiples of 64 kbps. Therefore, voice channels operating at 64 kbps can be multiplexed on a modified ADSL. The T1 rate is specified as 1.544 Mbps which is equivalent to 24×64 kbps and 8 kbps of overhead. All four high speed bearer transport rates are multiples of 1.536 Mbps, so T1 schemes easily interwork with ASDL schemes.

A diversified subchannel structure is defined to support a wide variety of applications. The subchannels operate at the bearer transport rates of LS0, LS1, and LS2 and is summarized in Table 3.

TABLE 3

| Channel | Rate (kbps) |
|---|---|
| LS0 | 16 or 64 |
| LS1 | 160 |
| LS2 | 384 or 576 |

The channel LS0, often referred to as the "C" channel carries the control signaling associated with the high speed channels and can also carry signaling information associated with the other low speed channels. The LS0 channel is mandatory while LS1 and LS2 are optional. The LS0 transports control, selection of services, and call setup signaling. When the LS1 channel transports the ISDN basic rate access, the signaling for LS1 is contained in the ISDN "D" channel. If the LS1 channel is used for non-ISDN transport, the associated signaling will also be contained in the LS0 channel. The LS0 channel operates at 16 kbps for ASDL applications operating at a maximum range (transport class 4 in TABLE 5), and 64 kbps otherwise. The LS2 channel can operate at either 384 kbps or 576 kbps.

The high speed subchannels are designated by AS0, AS1, AS2, and AS3. The default data rates for these four subchannels are required to match the rate of the bearer channel that they transport according to TABLE 4.

TABLE 4

| High Speed Subchannel Designation | Data Rate (Mbps) | Allowed Values of $n_k$ |
|---|---|---|
| AS0 | n0 × 1.536 | n0 = 0, 1, 2, 3 or 4 |
| AS1 | n1 × 1.536 | n1 = 0, 1, 2 or 3 |
| AS2 | n2 × 1.536 | n2 = 0, 1 or 2 |
| AS3 | n3 × 1.536 | n3 = 0 or 1 |

The assignment of low and high speed subchannels configurations depends upon the transport class and are defined during loop initialization. For any transport classes, there is a maximum number of subchannels that can be active. These classes are shown in TABLE 5. Using the variegated subchannel definition of ASDL, tethered virtual radio channel systems may be configured to carry digital voice, data, or both.

TABLE 5

| Transportation Class | Maximum Active High Speed Channels | Maximum Active Low Speed Channels |
|---|---|---|
| 1 | 4: AS0, AS1, AS2, AS3 | 3: LS0, LS1, LS2 |
| 2 | 3: AS0, AS1, AS2 | 2: LS0 and LS1 or LS0 and LS2 |
| 3 | 2: AS0, AS1 | 2: LS0 and LS1 or LS0 and LS2 |
| 4 | 1: AS0 | 2: LS0 and LS1 |

ASDL framing uses data frames that carry user information. Superframes are formed by aggregating the user data frames. The data frames consist of fast and slow buffers within which some of the user information bits are reserved for synchronization and control.

The ASDL user data is clocked at a discrete multitone symbol rate of 4000 baud. A superframe consists of 68 ASDL user data frames and is illustrated in FIG. 6. The superframe boundary is indicated by a synchronization symbol that is sent every 69 frames and is inserted into the data stream by the modulator. No user data or overhead information is included in the superframe synchronization symbol.

The raw symbol rate for ADSL is given by:

$$S=(69/68)*4000 \text{ baud}$$

The ADSL frame has a time duration given by 1/S (68/69*250 μsec). Since there are 69 frames in a superframe, the duration of a superframe is 17 msec (68*250 μsec). Structural information for the superframe is carried within the constituent frames of the superframe. Each frame is made up of a fast and slow buffer and superframe based information for the fast and slow buffers are carried separately.

In every superframe, 8 bits are reserved for transporting the cycle redundancy check (crc) (crc0–crc7) for the fast data buffer, and 24 information bits (ib) (ib0–ib23) are reserved for fixed overhead for supporting the operations, administration and maintenance functionality. The fixed overhead bits are referenced as indicator bits. These bits are carried in the first byte of the fast buffer, the "fast" byte of frame 0, 1, 34 and 35 as shown in TABLE 6.

TABLE 6

| Frame | Bit Assignment | | | | | | | |
|---|---|---|---|---|---|---|---|---|
| 0 | crc7 | crc6 | crc5 | crc4 | crc3 | crc2 | crc1 | crc0 |
| 1 | ib7 | ib6 | ib5 | ib4 | ib3 | ib2 | ib1 | ib0 |
| 34 | ib15 | ib14 | ib13 | ib12 | ib11 | ib10 | ib9 | ib8 |
| 35 | ib23 | ib22 | ib21 | ib20 | ib19 | ib18 | ib17 | ib16 |

For frames 2–33 and 36–67, the fast bytes of consecutive even and odd frames are grouped in pairs for assignment, and are assigned to either the embedded operations channel or for synchronization control of the bearer channels that are assigned to the fast buffer, depending upon whether bit 0 of each byte is 0 or 1. In these frame pairs, if the embedded operations channel (eoc) is transported, then bit 0 is set to 0. This is shown in TABLE 7.

TABLE 7

| Frames | Even Numbered Frames | | | | | | | | Odd Numbered Frames | | | | | | | |
|---|---|---|---|---|---|---|---|---|---|---|---|---|---|---|---|---|
| 2–33 & 36–37 | eoc6 sc7 | eoc5 sc6 | eoc4 sc5 | eoc3 sc4 | eoc2 sc3 | eoc1 sc2 | r1 sc1 | 1 0 | eoc13 sc7 | eoc12 sc6 | eoc11 sc5 | eoc10 sc4 | eoc9 sc3 | eoc8 sc2 | eoc7 sc1 | 1 0 |

The eoc is designed to allow the ADSL modems located at the central or local office to communicate with the remotely located ASDL transmit unit located on the customer premises (ATU-R) and the ADSL transmit unit located on the network side (ATU-C), where the ATU-C act as the link master and the ATU-R as the slave. With the eoc in-service and out-of-service maintenance may be performed, and the status and performance related parameters can be retrieved. Complete protocol specification for the eoc is provided in A.N.S.I. T1.413, Section 11.

TABLE 8

| Fast Byte | AS0 | AS1 | AS2 | AS3 | LS0 | LS1 | LS2 | ABX | LEX | FEC Redundancy |
|---|---|---|---|---|---|---|---|---|---|---|

TABLE 8 illustrates the format of the fast buffer frame format within each frame at the output of the FED encoder.

Both blocks AEX and LEX appear if there is an ASX subchannel assignment to the fast buffer. If there is an LSX assignment, then only the LEX appears. The assigned subchannels are synchronized for to a 32 kbps transmission rate. Therefore, for each subchannel, the length of its associated block will be the number of bytes that will be required to carry the transmission rate in multiples of 32 kbps. This function is defined as $B_F(X)$. If LS2 is assigned to the fast buffer with a bearer rate of 384 kbps, then $B_F(LS2)$ is 12.

The first byte of the interleaved buffer of each frame within the superframe is regarded as the "synch" byte. The synch byte of frame 0 carries the crc check bit for the previous superframe. In frames 1 through 67 the synch byte is used for synchronization control of the bearer channels that are assigned to the interleaved buffer or for carrying the ADSL overhead control channel (aoc). A LEX byte appears as the last byte in the interleaved buffer whenever bearers are assigned to the interleaved buffer. In this case, the ADSL overhead control channel data is carried in the LEX byte and the synch byte designates when the LEX byte contains ADSL overhead control channel data and when it contains data from the bearer data streams. If there are no bearer assignments to the interleaved buffer, then the LEX byte does not appear, bit synchronization is not required and the ADSL overhead control channel is carried directly in the synch byte.

The frame structure for the interleaved buffer as input to the FEC encoder is illustrated in TABLE 9.

TABLE 9

| Synch Byte | AS0 | AS1 | AS2 | AS3 | LS0 | LS1 | LS2 | AEX | LEX |
|---|---|---|---|---|---|---|---|---|---|

Depending on the application, the bearer subchannels may be assigned to the fast or interleaved buffer upon initialization. For each subchannel, the two byte combination $[B_0, B_1]$ is transmitted to indicate how the subchannel is allocated to the fast or interleaved buffer. There are seven specifications, one for each subchannel. A subchannel can be allocated to either the fast or interleaved buffer, but not to both.

Using ADSL requirements as specified, it is possible to achieve symmetric low speed residential applications with a bearer capacity of 640 kbps on one twisted pair line. For business applications operating at multiples of T1 rates, it is possible to develop systems operating at a maximum bearer capacity of 12.288 Mbps on four twisted pair lines. For low speed operations when both voice and data is transported, it will be appropriate to allocate the voice traffic to the fast buffer and the data traffic to the interleaved buffer. This way, the advantages of the higher level of coding will be obtained for the data traffic, while simultaneously minimizing the processing delay associated with interleaving the voice traffic. A similar approach can also occur to voice and data traffic in high speed business applications.

The processor 102 in the ISD 22 may be configured to discriminate between the various forms of traffic and to route this traffic to an appropriate device. Where high priority voice and/or video is distributed across the interface, the ISD may include one or more priority queues disposed in the SRAM and/or DRAM 103, 104. There may be different priority queues for each connected device on the premise distribution network (including any attached device described with regard to FIG. 2 or discussed herein). Additionally, there may be different queues for each device in both the transmit and receive direction. Further, control and signaling information may be assigned various levels of priority. A similar queue structure may also be implemented in the FMP. In one exemplary embodiment, the queues give priority to signaling information, and voice information for the various attached telephones. If a queue is in danger of overflow, flow control mechanisms may be utilized by the ISD and/or FMP. Voice data is accessed first using an appropriate queuing scheme such as priority fair weighted queuing or another suitable scheme. In addition to queuing, bandwidth may be varied so that more DSL frames are assigned to voice and/or video than data. Further, asymmetric DSL protocols may be dynamically implemented such that more bandwidth may be allocated to one direction or the other as necessary. Where one ISD 22 is serving as the node for, for example, a seven way conference call, the outgoing bandwidth for the node may need to be increased relative to the incoming bandwidth. However, where a PPV movie and/or Internet file is being downloaded, the bandwidth may be reversed such that more bandwidth is available from the network to the CPE equipment. Thus, asymmetric high speed transport of data to the home with the asymmetric character of the link and apportionment of that bandwidth variable depending on the amount of traffic results in a substantially more flexible platform to implement advanced services to the user. Multiple modem protocols may be downloaded into the DSL modem dynamically to chose the best protocol for a particular dynamic bandwidth allocation to maximize the amount of through put.

Figure 6A:
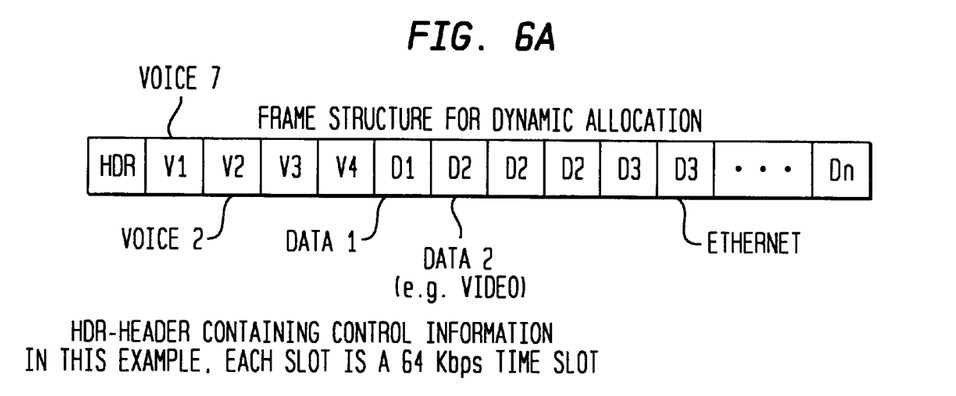
FIGS. 6A and 6B illustrate diagrams of the ASDL frame format.
Figure 6B:
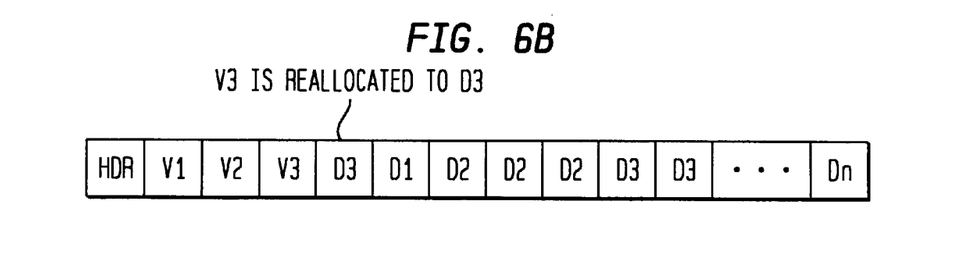

For example, with reference to FIGS. 6A and 6B, information may be multiplexed into one or more DSL frames in order to dynamically allocate bandwidth. In one exemplary embodiment, where data is being input to one of the connected data devices (e.g., a PC), and a voice call comes in, a dynamic allocation of bandwidth may occur. Assume that 1 Mbps is available for information transfer. Prior to the incoming call, all 1 Mbps may be completely used for the data transmission. However, as soon as a voice call comes in, since voice has a higher priority than data, a 64 Kbps channel is deallocated from data usage and is allocated for voice. If a second voice call comes in, then another data channel will be deallocated from data usage and allocated for voice. As a voice call gets terminated, then the allocated voice slots will be reallocated to use by voice in the next available frame. Hence, the system dynamically allocates on a frame by frame basis bandwidth in real time.

In an alternative embodiment, where individual packets are used to transport voice and data between the ISD 22 and the FMP 32, an individual channel does not need to be allocated. Voice packets are simply given priority over data slots in the frame. Therefore, silence periods may be used to the advantage and a higher overall bandwidth occurs. Data is simply stored in the buffer and/or slowed in its transfer using standard flow control where voice has priority. Signaling or header data in each packet may be used to establish priority in embodiment.

The dsl modem 114 may be variously configured to supporting transport over 18000 foot loops at following rates exceeding 1 Mbits/second, and may include adapting duplex and downstream bit-rates to the needs of the current traffic such that more bandwidth is provided to the upstream and/or downstream and/or between various devices based on an intelligent bandwidth allocation algorithm. The DSL modem may provide a single-tone DMT mode for low power operation during idle periods to avoid re-synchronization at next service request and enable "always on" functionality. The always on and/or virtually always on functionality allows voice/data calls to be established virtually instantaneously without long delays. The virtually always on functionality allows the channel bandwidth to adapt to the current needs of the system to minimize power consumption, reduce thermal dissipation, and generate less interference. For example, if no device is currently being utilized, only a very low bandwidth channel is required. Accordingly, by reducing the bandwidth available across the loop, it is possible to improve overall performance for other lines. The header HDR supplies the data that maps users (users) with the different data in the frame. It is always present. Note that signaling data may also be supplied and treated with an even higher priority than voice data. Signaling data serves the function of setting up the routes for all data transmitted in the packet.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method for dynamically allocating the bandwidth of a communication channel, comprising the steps of:

sensing by a terminal block the available bandwidth of said communication channel, the communciations channel being capable of supporting multiple, simultaneous service channels;

said terminal block determining whether a requested service requiring a predetermined bandwidth is capable of operating within said available bandwidth of said communication channel;

seizing said required bandwidth for said requested service if said available bandwidth is sufficient and denying said requested service if said available bandwidth is insufficient to support said requested service, and buffering said denied requested service until said communication channel bandwidth becomes available.

2. The method for dynamically allocating the bandwidth of a communication channel of claim 1, wherein said transmission of said multiple, simultaneous services occurs by modulating said requested service.

3. The method for dynamically allocating the bandwidth of a communication channel of claim 2, wherein said communication channel is capable of carrying a plurality of pulse code modulation, modulated requested services.

4. The method for dynamically allocating the bandwidth of a communication channel of claim 2, wherein said communication channel is capable of carrying a plurality of time division multiplexing, modulated requested services.

5. The method for dynamically allocating the bandwidth of a communication channel of claim 2, wherein said communication channel is capable of carrying a plurality of code division multiplexing, modulated requested services.

6. The method for dynamically allocating the bandwidth of a communication channel of claim 2, wherein said communication channel is capable of carrying a plurality of frequency division multiplexing, modulated requested services.

7. The method for dynamically allocating the bandwidth of a communication channel of claim 2, wherein said communication channel uses digital subscriber loop technology to carry said requested services.

8. A method for dynamically allocating the bandwidth of a communication channel, comprising the steps of:
   sensing by an element at one or the other end of a facility including a twisted cable pair the available bandwidth of said communication channel, said communication channel capable of supporting multiple, simultaneous service channels;
   said access module determining whether a requested service requiring a predetermined bandwidth is capable of operating within said available bandwidth of said communication channel;
   seizing said required bandwidth for said requested service if said available bandwidth is sufficient and denying said requested service if said available bandwidth is insufficient to support said requested service and
   buffering said denied requested service at said one or other end until said communication channel bandwidth becomes available.

9. The method for dynamically allocating the bandwidth of a communication channel of claim 8, wherein said transmission of said multiple, simultaneous services occurs by modulating said requested service.

10. The method for dynamically allocating the bandwidth of a communication channel of claim 9, wherein said communication channel is capable of carrying a plurality of pulse code modulation, modulated requested services.

11. The method for dynamically allocating the bandwidth of a communication channel of claim 9, wherein said communication channel is capable of carrying a plurality of time division multiplexing, modulated requested services.

12. The method for dynamically allocating the bandwidth of a communication channel of claim 9, wherein said communication channel is capable of carrying a plurality of code division multiplexing, modulated requested services.

13. The method for dynamically allocating the bandwidth of a communication channel of claim 9, wherein said communication channel is capable of carrying a plurality of frequency division multiplexing, modulated requested services.

14. The method for dynamically allocating the bandwidth of a communication channel of claim 9, wherein said communication channel uses digital subscriber loop technology to carry said requested services.

15. A method for dynamically allocating the bandwidth of a communication channel, comprising the steps of:
   determining the available bandwidth of said communication channel by sensing prior to securing a required service channel and after initialization of a requested service requiring a predetermined service channel bandwidth size;
   prioritizing said requested service according to a prioritization scheme;
   allowing said requested service if said available bandwidth for said communication channel is greater than said service channel bandwidth size and said prioritization scheme allows access; and
   buffering said requested service if said available bandwidth for said communication channel is less than said service channel bandwidth size and said prioritization scheme does not allow access.

16. The method for dynamically allocating the bandwidth of a communication channel of claim 15, wherein said sensing is performed by a terminal block.

17. The method for dynamically allocating the bandwidth of a communication channel of claim 15, wherein said sensing is performed by an access module.

18. The method for dynamically allocating the bandwidth of a communication channel of claim 15, wherein said prioritization scheme grades voice calls higher than other service requests.

19. The method for dynamically allocating the bandwidth of a communication channel of claim 15, wherein said prioritization scheme allows all of said available communication channel bandwidth to be allocated to specific services after higher ranked services are allowed access.

20. The method for dynamically allocating the bandwidth of a communication channel of claim 15, wherein said specific service is Internet traffic.

21. The method for dynamically allocating the bandwidth of a communication channel of claim 15, wherein said denied requested service is buffered until said communication bandwidth becomes available.

22. The method for dynamically allocating the bandwidth of a communication channel of claim 15, further comprising the step of transmitting multiple, simultaneous services in a plurality of said service channels.

23. The method for dynamically allocating the bandwidth of a communication channel of claim 22, wherein said transmission of said multiple, simultaneous services occurs by modulating said requested service.

24. The method for dynamically allocating the bandwidth of a communication channel of claim 23, wherein said communication channel is capable of carrying a plurality of pulse code modulation, modulated requested services.

25. The method for dynamically allocating the bandwidth of a communication channel of claim 23, wherein said communication channel is capable of carrying a plurality of time division multiplexing, modulated requested services.

26. The method for dynamically allocating the bandwidth of a communication channel of claim 23, wherein said communication channel is capable of carrying a plurality of code division multiplexing, modulated requested services.

27. The method for dynamically allocating the bandwidth of a communication channel of claim 23, wherein said communication channel is capable of carrying a plurality of frequency division multiplexing, modulated requested services.

28. The method for dynamically allocating the bandwidth of a communication channel of claim 23, wherein said communication channel uses digital subscriber loop technology to carry said requested services.

29. A method for dynamically allocating the bandwidth of a communication channel, comprising the steps of:
   determining the available bandwidth of said communication channel by sensing prior to securing a required service channel and after initialization of a requested service requiring a predetermined service channel bandwidth size;
   employing a service channel degradation scheme for allowing said service channel to occupy a predetermined smaller bandwidth for said requested service when said sensing determines said communication channel does not have a required service channel bandwidth;

allowing said requested service if said available bandwidth for said communication channel is greater than said service channel bandwidth size after all of said service channel bandwidths are degraded to a predetermined size; and denying said requested service if said available bandwidth for said communication channel is less than said service channel bandwidth size after all of said service channel bandwidths are degraded to the predetermined size.

30. The method for dynamically allocating the bandwidth of a communication channel of claim 29, wherein said sensing is performed by a terminal block.

31. The method for dynamically allocating the bandwidth of a communication channel of claim 29, wherein said sensing is performed by an access module.

32. The method for dynamically allocating the bandwidth of a communication channel of claim 29, wherein said denied requested service is buffered until said communication bandwidth becomes available.

33. The method for dynamically allocating the bandwidth of a communication channel of claim 29, further comprising the step of transmitting multiple, simultaneous services in a plurality of said service channels.

34. The method for dynamically allocating the bandwidth of a communication channel of claim 33, wherein said transmission of said multiple, simultaneous services occurs by modulating said requested service.

35. The method for dynamically allocating the bandwidth of a communication channel of claim 33, wherein said communication channel is capable of carrying a plurality of pulse code modulation, modulated requested services.

36. The method for dynamically allocating the bandwidth of a communication channel of claim 33, wherein said communication channel is capable of carrying a plurality of time division multiplexing, modulated requested services.

37. The method for dynamically allocating the bandwidth of a communication channel of claim 33, wherein said communication channel is capable of carrying a plurality of code division multiplexing, modulated requested services.

38. The method for dynamically allocating the bandwidth of a communication channel of claim 33, wherein said communication channel is capable of carrying a plurality of frequency division multiplexing, modulated requested services.

39. The method for dynamically allocating the bandwidth of a communication channel of claim 33, wherein said communication channel uses digital subscriber loop technology to carry said requested services.

40. A method for dynamically allocating the bandwidth of a communication channel, comprising the steps of:

determining the available bandwidth of said communication channel by sensing prior to securing a required service channel and after initialization of a requested service requiring a predetermined service channel bandwidth size;

employing a service channel degradation scheme for allowing said service channel to occupy a predetermined smaller bandwidth for said requested service when said sensing determines said communication channel does not have a required service channel bandwidth;

employing a prioritization scheme for grading said requested services;

allowing said requested service if said available bandwidth for said communication channel is greater than said service channel bandwidth size after all of said service channel bandwidths are degraded to a predetermined size, and said prioritization scheme allows access; and denying said requested service if said available bandwidth for said communication channel is less than said service channel bandwidth size after all of said service channel bandwidths are degraded to the predetermined size, and said prioritization scheme does not allow access.

41. The method for dynamically allocating the bandwidth of a communication channel of claim 40, wherein said sensing is performed by a terminal block.

42. The method for dynamically allocating the bandwidth of a communication channel of claim 40, wherein said sensing is performed by an access module.

43. The method for dynamically allocating the bandwidth of a communication channel of claim 40, wherein said denied requested service is buffered until said communication bandwidth becomes available.

44. The method for dynamically allocating the bandwidth of a communication channel of claim 40, further comprising the step of transmitting multiple, simultaneous services in a plurality of said service channels.

45. The method for dynamically allocating the bandwidth of a communication channel of claim 44, wherein said transmission of said multiple, simultaneous services occurs by modulating said requested service.

46. The method for dynamically allocating the bandwidth of a communication channel of claim 45, wherein said communication channel is capable of carrying a plurality of pulse code modulation, modulated requested services.

47. The method for dynamically allocating the bandwidth of a communication channel of claim 45, wherein said communication channel is capable of carrying a plurality of time division multiplexing, modulated requested services.

48. The method for dynamically allocating the bandwidth of a communication channel of claim 45, wherein said communication channel is capable of carrying a plurality of code division multiplexing, modulated requested services.

49. The method for dynamically allocating the bandwidth of a communication channel of claim 45, wherein said communication channel is capable of carrying a plurality of frequency division multiplexing, modulated requested services.

50. The method for dynamically allocating the bandwidth of a communication channel of claim 45, wherein said communication channel uses digital subscriber loop technology to carry said requested services.

* * * * *